United States Patent [19]
Suzuki et al.

[11] 4,317,037
[45] Feb. 23, 1982

[54] RADIATION DETECTION APPARATUS

[75] Inventors: Atsushi Suzuki, Higashiyamato; Koichi Urabe, Higashimurayama; Hiromichi Yamada, Hino; Hideki Kohno, Tokyo, all of Japan

[73] Assignee: Hitachi, Ltd., Tokyo, Japan

[21] Appl. No.: 47,133

[22] Filed: Jun. 11, 1979

[30] Foreign Application Priority Data

Jun. 9, 1978 [JP] Japan .................. 53/77887[U]

[51] Int. Cl.³ .............................................. G01T 1/20
[52] U.S. Cl. ..................................... 250/367; 250/486
[58] Field of Search .............................. 250/367, 486

[56] References Cited

U.S. PATENT DOCUMENTS

| 2,727,154 | 12/1955 | Goldsworthy | 250/367 |
|---|---|---|---|
| 2,853,620 | 9/1958 | Fox et al. | 250/367 |
| 3,089,956 | 5/1963 | Harper | 250/486 |
| 3,603,792 | 9/1971 | Gallaro et al. | 250/486 |
| 3,825,763 | 7/1974 | Ligtenberg et al. | 250/486 |
| 3,857,036 | 12/1974 | Novak | 250/367 |
| 4,037,105 | 7/1977 | Laurer | 250/367 |
| 4,039,840 | 8/1977 | Shimiya et al. | 250/486 |
| 4,090,081 | 5/1978 | Takami et al. | 250/367 |
| 4,180,737 | 12/1979 | Kingsley | 250/367 |

FOREIGN PATENT DOCUMENTS 2010891 7/1979 United Kingdom .

Primary Examiner—Davis L. Willis
Attorney, Agent, or Firm—Craig and Antonelli

[57] ABSTRACT

In radiation detection apparatus apparatus having a plurality of radiation detector each comprising a scintillator which emits light in response to a radiation, and a photodetector which detects an emission intensity of the scintillator; radiation detection apparatus characterized in that the scintillator is made of a layer of phosphor particles, so that the performances of the respective detectors are substantially identical.

14 Claims, 9 Drawing Figures

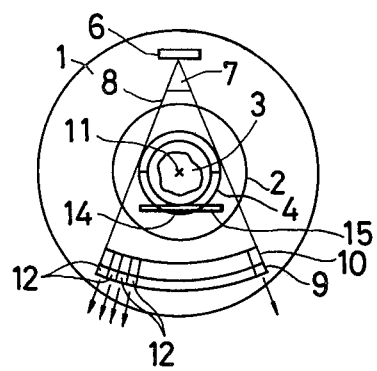
FIG. 1
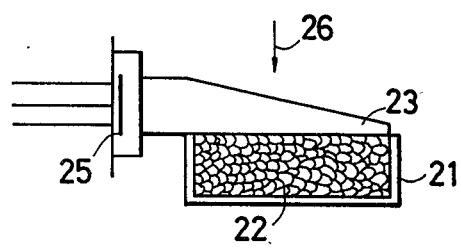
FIG. 2
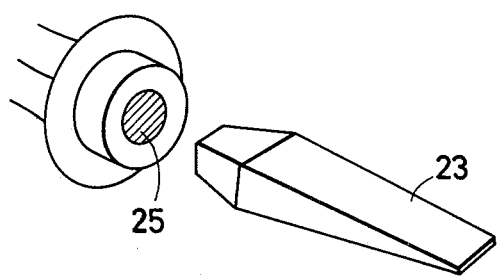
FIG. 3
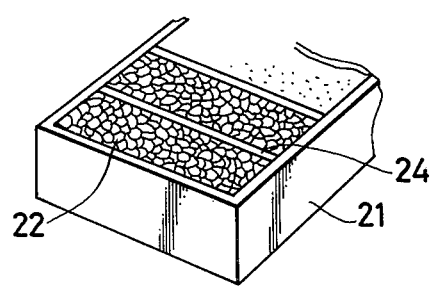

RADIATION DETECTION APPARATUS

BACKGROUND OF THE INVENTION

This invention relates to apparatus for detecting radiations such as X-rays and γ-rays. More particularly, it relates to radiation detection apparatus for use in X-ray CT (computerized tomography), a positron camera etc.

The equipment of the X-ray CT, the positron camera or the like requires, for example, 30 to 1,000 detectors of uniform performances.

Heretofore, as radiation detectors for the X-ray CT etc., there have been employed a gas chamber using xenon and a detector comprising bismuth germanate ($Bi_4Ge_3O_{12}$, abbreviated to "BGO") and a photomultiplier in combination. With these detectors, it has not been easy to make the characteristics of respective channels uniform. As a result, the whole detection apparatus has been difficult to form a satisfactorily clear image.

Especially, with the detectors each comprising the BGO and the photomultiplier in combination, it has been very difficult to make the characteristics of the respective detectors uniform on account of the deviations of the characteristics of BGO single-crystals used as scintillators and the deviations of the characteristics of the photomultipliers.

LIST OF PRIOR ART (37 CFR 1.56 (a))

The following reference is cited to show the state of the art:

Japanese published unexamined patent application No. 52-42086

SUMMARY OF THE INVENTION

An object of this invention is to provide a radiation detection apparatus which comprises a large number of radiation detectors of uniform performances.

Another object of this invention is to provide radiation detection apparatus which is excellent as detection apparatus especially for the X-ray CT for the whole body.

These and other objects are accomplished by radiation detection apparatus having a plurality of radiation detectors each comprising a scintillator which emits light in response to a radiation, and a photodetector which detects an emission intensity of the scintillator, characterized in that the scintillator is made of phosphor particles.

BRIEF DESCRIPTION OF THE DRAWINGS

FIG. 1 is a schematic plan view for explaining an example in which radiation detection apparatus of this invention is applied to the X-ray CT, FIGS. 2, 6, 7 and 9 are sectional views of radiation detectors according to this invention, FIG. 3 is an exploded view of radiation detection apparatus according to this invention.

DETAILED DESCRIPTION OF THE PREFERRED EMBODIMENTS

Figure 4:
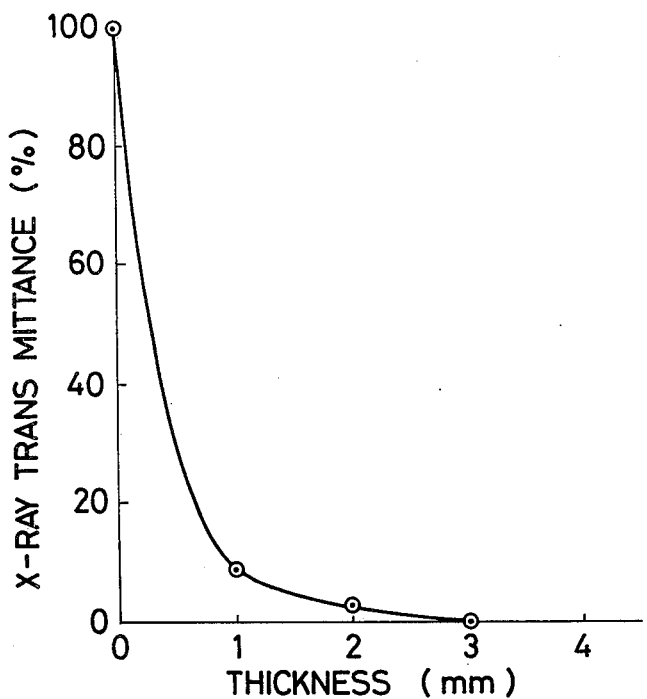
FIGS. 4, 5 and 8 are diagrams for explaining this invention.

The radiation detection apparatus of this invention is required for the X-ray CT, a positron camera, the measurement of an X-ray profile, etc.

The X-ray CT has various types, an example of which is illustrated in FIG. 1. An X-ray beam 8 which expands in the shape of a sector and radiation detection apparatus 9 which comprises a circular array of a large number of X-ray detectors 12 with the center at an X-ray source 6 are rotated around a test piece 3. Outputs of the respective radiation detectors 12 are measured at every predetermined angle (for example, 1°). The cross-sectional images of the test piece 3 are reconstructed from the measured values. In the figure, numeral 1 designates a turntable member, which supports the X-ray source 6, a collimator 7 and the radiation detector apparatus 9 and which is formed with a central opening 2. Preferably, a collimator train 10 is disposed as shown in the figure between the test piece 3 and the radiation detection apparatus 9.

The turntable member 1 and the parts mounted thereon can be rotated about an axis 11 at the center of the opening 2 by means of a motor (not shown) which drives gearing (not shown). Numeral 15 designates a supporting member for supporting the test piece 3. The supporting member 15 is separated into two parts, one of which is located on the front surface of the turntable member 1 and the other of which is located on the rear surface thereof. A gap between these parts serves to permit X-rays to permeate. Shown at 14 is a flange, which secures a collar 4 to the supporting member 15.

Although, in the figure, the radiation detection apparatus 9 and the collimator train 10 are illustrated in the circular shape, they may well be rectilinear when the sectoral extent of the X-ray beam 8 is narrow.

It is also allowed that the radiation detection apparatus 9 and the collimator train 10 are arranged and fixed over the whole periphery without mounting them on the turntable member 1, and that only the X-ray source 6 and the collimator 7 are rotated along with the turntable member 1.

In order to obtain the cross-sectional image with a high precision, the width of the radiation detector should preferably be about 1–10 mm, more preferably about 1–3 mm. By way of example, a width of 1.3 mm is adopted.

This invention employs as a scintillator a phosphor layer which is made of a phosphor of fine powder, and reduces the deviations of characteristics among a plurality of scintillators.

In general, the deviations of the characteristics such as brightness of a phosphor are within 1% even for different manufacturing lots if the lots of the raw materials of the phosphor are identical. If the lots of the raw materials are different, the deviations among the lots sometimes get at about 5%. Even in the case of phosphor particles having such deviations, however, the deviations of the characteristics as scintillators become approximately 1/(square root of the number of particles in one detector) when the scintillators are manufactured by mixing the particles well. That is, supposing that the number of particles is 300,000, the deviations become below about 0.01%.

Th phosphor may be any insofar as it absorbs radiation and emits light. Here, the expression "light" signifies light in a broad sense including infrared and ultraviolet lights besides visible light. By way of example, there are employed $Y_2O_2S$, $La_2O_2S$, $Gd_2O_2S$, $Lu_2O_2S$, LaOBr, BaFCl, BaFBr and $BaSO_4$ which are activated with at least one of Eu, Pr and Tb; CdS: Cu, Al; CdS: Ag, Cl; ZnS: Cu, Al; $CaWO_4$: $CdWO_4$; etc. In particular $Gd_2O_2S$ (Eu), $Gd_2O_2S$(Pr), $CaWO_4$, etc. Which exhibit high absorptivities for X-rays are favorable as the phosphors. It is also possible to mix and use two or more of the phosphors. The average particle size of the phosphor should preferably be 200 μm or less, more preferably 100 μm or less, because the deviations of the characteristics as detectors become smaller as the number of phosphor particles in the phosphor layers are greater. On the other hand, when the phosphor particles are too small, the sum of the surface areas of all the phosphor particles in the phosphor layer becomes large, and hence, the emission intensity from the phosphor layer decreases. Accordingly, the average particle size of the phosphor should preferably be 1 μm or greater, more preferably 5 μm or greater.

Hereunder, this invention will be described with reference to the drawings.

FIG. 2 is a sectional view of an embodiment of a radiation detector according to this invention. Except for a light transmission window, which is the surface contacting the phosphor particles 22 with the light guide 23 provided above, the inner wall of a container 21 is coated with a reflective film of a substance such as aluminum and silver which has a high reflection factor for visible and near-infrared light rays. The container 21 should preferably be one which, except for an incident plane for the radiation 26, is shielded by a substance such as tungsten and lead adapted to shield it from the radiation or which is made of such substance. Phosphor particles 22 are held in the container 21. Light emitted from the phosphor in response to the radiation is directed to an optical guide 23 through the light transmitting window. From one end of the optical guide 23 it is received into a silicon photodetector 25, in which it is converted into an electric signal. The surfaces of the optical guide 23 other than those lying in contact with the light transmitting window and the silicon photodetector 25 are provided with a light reflective film such as of aluminum.

The optical guide 23 is not always required. By way of example, it is also allowed to form the light transmitting window on a side of the container and to directly mount the photodetector on the container.

Optical guides for leading the light emission from the phosphor layer to the light transmitting window may well be disposed over and under the layer.

FIG. 3 is a partial exploded explanatory view of radiation detection apparatus in which a plurality of radiation detectors are coupled. Respective channels are separated by radiation shield plates 24 made of tungsten, lead or the like (light reflective films are disposed on both the surfaces of each shield plate), an identical phosphor is put in the channels, and optical guides 23 and photodetectors 25 (only one set is shown ) are disposed for the individual channels. The shield plates 24 are not always necessary, but light emissions of the respective channels may well be separated by light reflective films only. When, as illustrated in FIG. 1, the collimator train 10 is disposed in front of the radiation detection apparatus 9, the shield plates 24 need not be especially provided.

The thickness of the phosphor layer is determined so that the phosphor may sufficiently absorb the radiation used. FIG. 4 is a graph which shows the X-ray transmission factor of a phosphor layer in the case of employing a phosphor $(Gd_{0.999}Pr_{0.001})_2O_2S$. The X-ray irradiation condition is 120 kV—3 mA. As seen from the graph, X-rays are absorbed 98% at a phosphor layer thickness of 2 mm and substantially 100% at 3 mm. Accordingly, the thickness of the phosphor layer suffices with 3 mm at such extent of X-ray intensities as used in the X-ray CT. If some loss is allowed for, even the thickness of 2 mm causes no problem in practical use.

In this case, the packing density of the phosphor is 4.3 gr/cm$^3$. It is also allowed to harden the phosphor layer with a substance of substantially good transparency, for example, a resin such as polystyrene. In the case where, at such a time, the substantial packing density of the phosphor lowers, the thickness needs to be increased in inverse proportion thereto.

Figure 5:
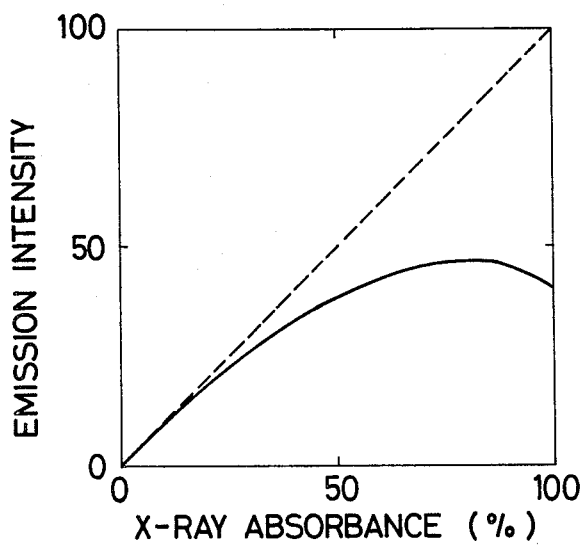

The reflection factor of the surface of a certain phosphor particle for light emission from another phosphor particle is near 100% in some kinds of phosphors. As a result, even in the case of a phosphor particle in the inner part of a phosphor layer which is thick to some extent, most of its light emission reaches the surface of the layer. However, the reflection factor is not 100%, so that when the phosphor layer is too thick, the light emission in the inner part of the layer cannot be effectively taken out of the phosphor layer. FIG. 5 is a graph which shows the relationship between the quantity of X-ray absorption and the sum of light emissions from both the upper and lower surfaces of a phosphor layer at the time when the phosphor $(Gd_{0.999}Pr_{0.001})_2O_2S$ (having an average particle size of 6 μm) was put into layers of various thicknesses and when the layers were irradiated by X-rays. As apparent from the graph, when the phosphor layer is thin, an emission output which is substantially proportional to the quantity of absorbed X-rays can be taken out of the layer.

In the radiation detector according to this invention, therefore, it is preferable that the phosphor layer is divided into two or more layers and that an optical guide for leading the light emission from the phosphor layer to the light transmitting window of the container is installed on at least one surface of each divided layer. Of course, it is more preferable to dispose the optical guides on both the surfaces of the layer. The thickness of the layer needs to be at least at a value sufficient to absorb X-rays and emit light. As understood from the foregoing drawings, when the thickness of the layer is increased, the emission output from the layer increases till a certain thickness, beyond which the emission output decreases conversely. Accordingly, the favorable thickness of the layer is at most a value beyond which the emission output of the layer does not increase.

The emission output from the phosphor layer is dependent upon the X-ray absorption coefficient of the phosphor layer, the absorption coefficient of the phosphor layer for an emission wavelength, the scattering coefficient of the phosphor layer for the emission wavelength and the thickness of the phosphor layer. Strictly speaking, accordingly, the favorable thickness of the phosphor layer differs depending upon the kinds of phosphors. In general, however, the favorable thickness is at most 100 times the average particle size of the employed phosphor in case where the optical guides are disposed on both the surfaces of the layer. A more favorable thickness of the layer is at least 2 times and at most 50 times the average particle size of the employed phosphor. In particular, the thickness of the layer among the plurality of layers on the side on which the radiation is incident should favorably be put into the range specified above.

Figure 6:
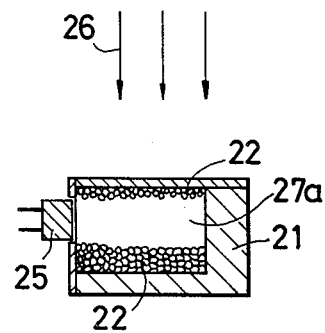
Figure 7:
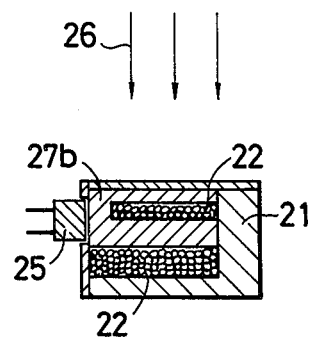

Examples in which the phosphor layer is composed of two layers are shown in FIGS. 6 and 7. Referring to FIG. 6, an upper phosphor layer (Gd$_2$O$_2$S: Pr) which is 0.1 mm thick is disposed on the upper surface of a container 21 having light reflective films on its inner side of the container on which X-rays 26 are incident. Here, approximately 20% of the incident X-rays is absorbed. The X-rays having passed through this layer pass through a space 27a acting as an optical guide, and most of them is absorbed by a lower phosphor layer which is 2 mm thick. Light emissions from the upper and lower phosphor layers enter a photoelectric transducer 25 through the space 27a, and are converted into current here.

The manufacture of the phosphor layer is conducted as stated by way of example below. 100 gr of a phosphor expressed as $Gd_2O_2S$: Pr (average particle size: 17 $\mu m$) is mixed into 15 cc of an aqueous solution of polyvinyl alcohol, and they are mixed well into slurry. The slurry is applied into a container of predetermined size. After drying it at 60° C., it is taken off from the container. The dried compact is fixed to the bottom of the container 21 of the radiation detector with a bonding agent which is substantially light-transmissive (for example, epoxy-based bonding agent). The phosphor layer whose thickness is below about 0.5 mm is manufactured in such a way that a cover part of the container 21 of the radiation detector is provided with a groove of predetermined thickness and that the slurry is directly applied into the groove and then dried.

In the radiation detector shown in FIG. 7, an upper phosphor layer has a thickness of 0.4 mm and is buried in an optical guide 27b made of an acrylic resin. Light emission from the phosphor 22 is led to the optical guide 27b from both the upper and lower surfaces of the layer. A lower phosphor layer has a thickness of 2.6 mm, and is arranged between the optical guide 27b and the bottom surface of a container 21.

Thirty such detectors were fabricated, and the deviations of the characteristics of the detectors were studied. The deviations of characteristic curves indicative of the proportionalities between the quantities of X-rays and the outputs of the respective detectors subjected to calibrations were below 0.2%.

As described above, by dividing the phosphor layer into two layers, the output could be enhanced by 60–70% over the case of the single layer structure (FIG. 2). When the lower phosphor layer is further divided into a plurality of layers, the output can be enhanced more. However, it is inconvenient in the manufacture to divide the layer into an excessively large number of layers, and the number of the phosphor layers in one radiation detector should preferably be 2 to 5.

Figure 8:
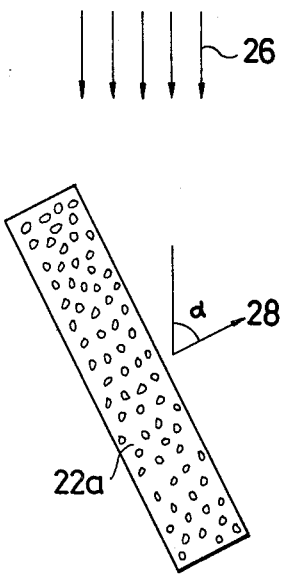

The radiation detector according to this invention shall further include one constructed as described below. In the construction, a phosphor layer is inclined and arranged so that a line perpendicular to the phosphor layer may define an angle of 10–80 degrees, preferably 30–60 degrees from the incident direction of X-rays. FIG. 8 shows a phosphor layer in a model-like fashion. The phosphor layer is arranged so that a line 28 perpendicular to the phosphor layer may define an angle $\alpha$ with respect to the incident direction of X-rays 26. Assuming now that the angle is 60 degrees, the effective depth in the direction of the line 28 perpendicular to the layer of the phosphor 22 becomes $\frac{1}{2}$ relative to the depth in the incident direction of the X-rays, and the emission output increases to that extent.

Figure 9:
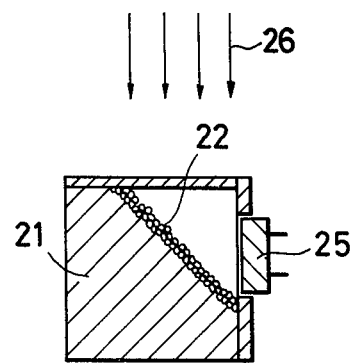

FIG. 9 is a sectional view of an example of a radiation detector as described above. The phosphor layer is arranged so that the line perpendicular thereto may define an angle of 45 degrees with respect to the incident direction of the X-rays 26. In this case, the output is enhanced by about 30% as compared with that in the case where the phosphor layer is not inclined.

Also in the radiation detector of such structure, the output is further enhanced by dividing the phosphor layer into a plurality of layers. By way of example, the output is enhanced more in such a way that, as in FIG. 6, a phosphor layer is disposed at the cover part of the container 21 of the radiation detector in FIG. 9.

As set forth above, the radiation detection apparatus of this invention can be employed for a case of measuring the profile of a radiation transmitted through a predetermined object, and besides, for the measurements of the general profiles of X-rays, etc.

What is claimed is:

1. A radiation detection apparatus comprising a plurality of scintillators each of which includes at least two spaced superposed phosphor layers made of phosphor particles for emitting light in response to received radiation, the thicknesses of said two phosphor layers being different from each other; and a plurality of photodetectors, each photodetector being disposed so as to face the space between layers and directly receive the light emitted into that space by a respective one of the scintillators.

2. Apparatus according to claim 1, wherein the thickness of the first layer of said two phosphor layers is less than that of the second layer which is positioned to receive the radiation passing through the first layer.

3. Apparatus according to claim 1 or claim 2 wherein the scintillator is arranged in a container whose inner wall surface is light-reflective and the container has a light transmitting window through which the light emitted toward the outside by the scintillator passes towards the photodetector.

4. Apparatus according to claim 3, wherein each said photodetector is directly disposed on the light transmitting window of a respective scintillator.

5. Apparatus according to claim 1, wherein at least one surface of each of said phosphor layers is provided with an optical guide for conducting the light emitted from that layer to the photodetector.

6. Apparatus according to claim 5, wherein the first layer has on each of its surfaces an optical guide for conducting the light emitted from that layer to the photodetector.

7. Apparatus according to claim 5, wherein said two phosphor layers are spaced and said optical guide is disposed in said space between said layers.

8. Apparatus according to claim 2, wherein the thickness of the first layer is at least twice and not more than 50 times the average particle size of the phosphor particles of the layer.

9. Apparatus according to claim 2, wherein the second layer is arranged so that the layer is inclined to the incidence direction of said radiation.

10. Apparatus according to claim 1, wherein each layer is at an angle to the direction of incidence of the radiation.

11. Apparatus according to claim 1, wherein the phosphor is one or more of $Y_2O_2S$, $Gd_2O_2S$, $Lu_2O_2S$, LaOBr, BaFCl, BaFBr, $La_2O_2S$ and $BaSO_4$ (in each case activated with at least one of Eu, Pr and Tb); CdS: Cu, Al; CdS: Ag, Cl; ZnS: Cu, Al, $CaWO_4$; and $CdWO_4$.

12. Apparatus according to claim 1, wherein the phosphor particles have an average particle size in the range 1 to 200 $\mu m$.

13. Apparatus according to claim 3, wherein said container is shielded by radiation shielding material except at said light transmitting window and at a surface at which said radiation is incident.

14. Apparatus according to claim 1, wherein said phosphor particles are buried in a substance which is substantially light-transmissive.

* * * * *